Patented Nov. 25, 1947

2,431,497

UNITED STATES PATENT OFFICE 2,431,497

SHORTENING

Gerald C. North, Alvin J. Alton, and Lawrence Little, Chicago, Ill., assignors to Beatrice Creamery Company, Chicago, Ill., a corporation of Delaware No Drawing. Application January 14, 1946, Serial No. 641,169

4 Claims. (Cl. 99—123)

This invention relates to a powdered free-flowing shortening composition suitable for making bread, cakes, pastries, and a variety of other food products. By powdered shortening is meant a powder in which each particle consists of a fat core and a protective hull or casing of edible material, e. g., skim milk solids, whey solids, natural buttermilk solids, cream solids, normal milk solids and solids derived from soya bean e. g. soya bean flour and soya bean milk solids.

These powdered shortenings have acquired considerable importance as indicated by substantial commercial acceptance but present specific problems. For example, some bakeries, consumers and housewives prefer an open texture in the baked product but others, particularly in cakes, demand a close texture. In some cases, it appears that powdered shortenings contribute to an open texture in the baked products, and it is the object of this invention to provide a powdered shortening of such composition that a fine texture will be obtained, notably in the case of cakes.

We have discovered that fine or close textured baked goods may be made by including in the shortening composition, an effective amount i. e., about .2 to 6% based on the weight of the final product, of an ester of a fatty acid and polyhydric alcohol having one or more free alcoholic hydroxyl groups on the polyhydric alcohol component of the ester, or, stated otherwise, a glyceryl ester of a fatty acid having a free glyceryl alcohol group.

Examples of such compounds are glycerides, such as mono- or di-glycerides, the glyceryl esters of each of the following: mono- and di-oleates, mono- and di-laurates, mono- and di-stearates, and mono- and di-palmitates, mono- and di-ricinoleates, and mono- and di-sodium sulfoacetates of glycerol mono- and di-stearates.

The following example illustrates one manner of carrying out the present invention:

Example

Place 1,000 pounds of liquid skim milk (9.0% solids) in a suitable vat and add 338 pounds of water. While this mixture is heating with agitation, add 438 pounds of fat, 60 pounds of corn syrup (82% solids) and 6 pounds of partially stearated reduced dextrose. This mixture is heated with suitable agitation to about 150° to 170° F.; held at this temperature for about 20 minutes, homogenized at 2,000 pounds pressure or higher, and spray dried.

Partially stearated reduced dextrose, in the foregoing example, is sorbitol ester of stearic acid with one or more free OH groups and is representative of substances recited above which may be used.

The example illustrates a composition wherein the usual milk solids employed to form the hull, or soya bean solids are partially replaced by a carbohydrate.

The invention is further useful where the hull is composed entirely of milk solids or soya bean solids as well as where all of such solids are replaced, e. g., a composition consisting of fat, egg yolk and wheat flour, or fat, soya bean flour and corn syrup solids. In other words, the invention can be applied not only to compositions wherein milk solids or other protein containing materials are alone employed to produce the hull about the fat granule, but also to compositions wherein the milk solids or other proteinous materials are partially or wholly replaced by other hull forming ingredients. Where the milk or soya bean solids are partially replaced by carbohydrates, the latter may constitute the major constituent of the hull and the milk solids or other proteinous material the minor constituents e. g., less than one third the total amount of the hull.

In the various compositions, lecithin in amount of .2 to 1.5 parts by weight on the final product may be employed, preferably about .4 and algin containing materials such as sodium alginate, gums such as gum acacia, gum arabic, gum tragacanth, agar agar, and Irish moss may be included also in the amount of about .1 to .6, preferably .2 in each example. The lecithin or algin or gums may be alone included, or mixtures thereof may be used.

The edible shortening fat or oils may be liquid materials, semi-solid materials, or those which are solid at room temperature, either natural or chemically produced such as by hydrogenation. The oils may be cottonseed oil, corn oil, peanut oil, sunflower oil, or other edible oils, the semi-solid fats may be lard, butter, oleomargarine or the like, the solid fats may be animal fats or they may be the liquid oils previously mentioned which have been hydrogenated, or they may be hydrogenated soybean oil, hydrogenated fish oil, sperm oil or the like, or any combination of oils, semi-solid or solid fats. These comminuted shortenings contain upwardly of 50% of these fatty materials.

With reference to the carbohydrates employed, they are: sugar which may be cane, beet, or corn sugar; the flour may be wheat, rye, potato, oat, or "gelatinized" wheat flour (a flour which has been processed by treatment with water and heated to make it water absorptive, i. e., thicken when mixed with water and heated); the corn syrup solids may be liquid or dried; and starches, i. e., corn starch, wheat starch, rye starch, cassava starch, barley starch, and potato starch. The proteins are soya bean flour or peanut flour.

While the example shows a total fat of 73 parts, this may be departed from and the fat may be present in amount of about 50 to 80 parts.

This application is a continuation-in-part of our allowed application Serial Number 510,543, filed November 16, 1943.

We claim:

1. A granular shortening having a fat core, an edible hull, and a compound from the group consisting of an edible partial ester of glycerine and a higher fatty acid, and a partial ester of sorbitol and stearic acid.

2. The process of making a granular shortening having a fat core, an edible hull, and a compound from the group consisting of an edible partial ester of glycerine and a higher fatty acid, and a partial ester of sorbitol and stearic acid, which comprises preparing an emulsion of the said ingredients and drying the same to form a dry powder.

3. A granular shortening according to claim 1 wherein the compound is a sorbitol ester of stearic acid with 5 free OH groups.

4. A granular shortening according to claim 1 wherein the compound is glycerol mono-stearate.

GERALD C. NORTH.
ALVIN J. ALTON.
LAWRENCE LITTLE.

REFERENCES CITED

The following references are of record in the file of this patent:

UNITED STATES PATENTS

| Number | Name | Date |
| --- | --- | --- |
| 2,035,899 | Kraft | Mar. 31, 1936 |
| 2,132,417 | Harris | Oct. 11, 1938 |
| 2,223,558 | Epstein | Dec. 3, 1940 |
| 2,232,401 | Newton et al. | Feb. 18, 1941 |